Feb. 18, 1969 F. PFLEIDERER ETAL 3,428,753

LONG-DISTANCE TELEPHONE SYSTEM

Filed Oct. 12, 1964

United States Patent Office
3,428,753
Patented Feb. 18, 1969

3,428,753

LONG-DISTANCE TELEPHONE SYSTEM

Friedrich Pfleiderer, Munich-Solln, Heinz Mertel, Hohenschaftlarn, and Erik Hoffmann and Ekkehard Seidel, Munich, Germany, assignors to Siemens Aktiengesellschaft, Munich, Germany Filed Oct. 12, 1964, Ser. No. 403,063
Claims priority, application Germany, Oct. 22, 1963, S 87,973
U.S. Cl. 179—18 8 Claims
Int. Cl. H04m 7/00

ABSTRACT OF THE DISCLOSURE

A method of long-distance dial telephone communication having register-controlled exchange systems. Call connection demands are processed and supervised by exchanges over both speaking paths and signal channels common to several speaking paths, associated with each exchange. Each exchange includes a central control system and registers for the processing of call connection demands. Line signals including, for example, seizure, start, and stop signals are transmitted over the signal channels and register signals including, for example, dial, dial termination, and busy signals are transmitted over the speaking paths. The condition of seizure of the speaking paths is recorded in the central control means, so that a path finding process is not necessary. No signal conductors or seizure conductors are required.

CROSS REFERENCE TO RELATED APPLICATION

Applicants claim priority from German patent application Ser. No. S 87,973 filed Oct. 22, 1963.

BACKGROUND OF THE INVENTION

*Field of the invention*

This invention concerns a circuit arrangement for long distance communication, and in particular for dial telephone systems, wherein connections are produced and supervised over speaking paths, as well as signal channels common to several speaking paths, and, further, wherein the switching members in the exchanges are controlled by registers.

STATE OF THE PRIOR ART

There are known telephone system circuit arrangements wherein all the signals (as distinguished from the voice messages) are transmitted over a signal channel which is common to several speaking paths. A disadvantage of this system is that the signal channels are heavily burdened and therefore must be available in large numbers, so that, despite an expensive and complicated system, they contribute little to making the arrangement less expensive. Moreover, if all of the installations participating in a connection do not operate properly, there is danger that connections can easily be improperly set up, released or affected.

Another known approach provides for transmission of only the release or only the metering signals over a signal conductor common to several speaking paths, while all other signals are transmitted over the speaking paths. Disadvantages of this approach are that the speaking paths are overloaded by the signal transmission and special arrangements are necessary for providing for signal transmission in the speaking paths. The result is that the signal channels do not bring about the desired relief of the burden on the speaking paths.

Another known system provides for transmission of only simple signals over the speaking conductors, while complex information is transmitted only over the signal channel within an exchange office. Thus, only demand signals from a storage means to a marker are to be placed in the speaking paths, while the interchange of the remaining signals occurs over the signal conductors. With this system the danger of an improper operation is, for practical purposes, avoided. However, signals which are ultimately necessary at the speaking conductors are also conveyed over the signal channels and must then be transformed into the speaking paths. Furthermore, this process is not suitable for connections made through a plurality of exchange offices extending in a row, since the possibility exists that demand signals from several storage means will simultaneously reach the same marker for causing its connection to different speaking paths.

SUMMARY OF THE INVENTION

The purpose of the invention is to provide a circuit arrangement wherein the disadvantages of these known and other arrangements are avoided. The circuit arrangement of this invention is characterized by the fact that the line signals, such as seizure, initiation, disconnection, and release signals, as well as intercept signals, are transmitted over the signal channels. On the other hand, in addition to the voice messages, the speaking channels carry dial signal information, and also the register signals produced and/or evaluated in the registers, as for example the dialing termination, busy, and recall signals.

The circuit arrangement according to the invention has the particular advantage that, through the cooperation of the speaking path and signal channel in the transmission of signals, it may readily be ascertained that the information transmitted thereon concerns the same connection and does not improperly concern two different connections. Moreover, the transmission of signals by way of both the signal and the speaking paths assures continuous supervision of both paths with regard to suitability of operation, even before the completion of a speaking connection which is to be counted for charge purposes.

The distribution of the signals in the manner indicated in accordance with the invention has a number of further advantages, including the reduction in the load on the speaking paths so that they can be better utilized. Moreover, some signals, such as free and busy signals, which are transmitted to the calling subscriber through his receiver, can be transmitted in the speaking path, in accordance with the invention, so that repeated transformation of these signals in transit exchange offices is no longer necessary. This fact decreases the possibility of errors and also decreases the transmission time. In addition, signals which are produced and/or evaluated in the registers are transmitted within the speaking band over the speaking paths at high speeds, particularly if they are produced by working data apparatus such as machine senders and receivers, which code the signals with phase or frequency modulation. As a result, all exchanges approached during the course of the setting up of the connection, before removal of the receiver by the called subscriber, can directly correspond with the originating exchange office, over the speaking paths, without being influenced by the intervening installations. With such a system there is no need for temporary storage and transformation of the information in the intervening exchange offices. Furthermore, because of the omission of identification, and of the central control means, for these signals, the required expenditure for apparatus at the intervening or transit offices is reduced to a minimum. Indeed, because of the omission of temporary storage, the transmission time for the registration signals is decreased.

The distribution of signals provided by the invention has the further advantage that only such signals are transmitted by the speaking paths which need no further conversion. The result is that the commonly used line repeaters, such as sound dialing and carrier frequency repeaters, which operate to divide speaking messages from signals, may be eliminated.

An advantage of the invention is that during the setting up of the connection, as well as during the call itself, various registers can be caused to connect themselves to the speaking path, without influencing transmission of speech or signals thereby.

A further development of the invention, for long distance communication exchange installations, involves a central control means which contains an indication of the condition of each speaking path and information as to which speaking paths are connected to each other. This control means may contain a suitable storage means for this purpose, so that, upon production of a connection by way of signal channels during an existing speaking connection, no identification potentials or search frequencies, or the like, for the ascertainment of the course of the speaking connection, have to be placed on the speaking paths. In other words, no special pathfinder network is required. Rather, it is sufficient to make connection with the central control means to obtain the necessary information. Further, an advantage is that no signal conductors, and in appropriate cases no seizure conductors such as *c*-conductors, are required in the speaking path couplings, so that the coupling devices may be of simpler and less expensive form, requiring less space.

The invention will now be more fully described in conjunction with a drawing showing preferred embodiments thereof.

DETAILED DESCRIPTION OF THE INVENTION

Figure 1:
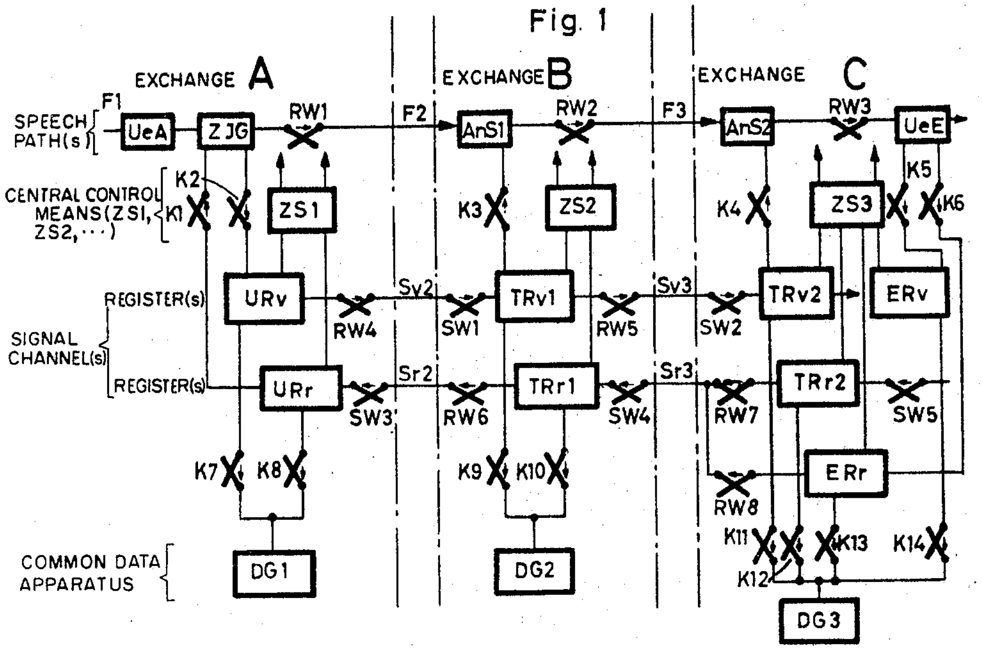
FIG. 1 is a diagrammatic view of one embodiment of the invention.
Figure 2:
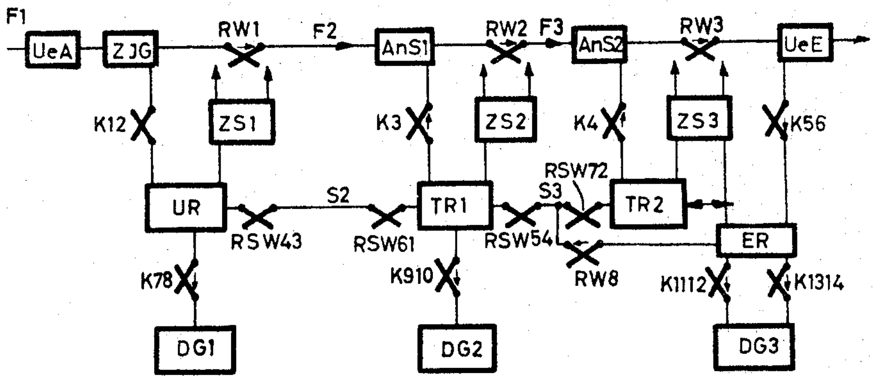
FIG. 2 is a diagrammatic view of a modification of the apparatus of FIG. 1.

In the apparatus of FIG. 1, separate signal channels for the forward and reverse directions of communication of signals are contemplated, and accordingly separate registers for such different-direction signals are provided. As will be explained hereinafter, the apparatus of FIG. 2 is capable of exchanging these signals by way of common signal channels extending between the originating office A, a transit office B, and a terminating office C.

As indicated in FIG. 1, exchange office A is connected with exchange office B over speaking path F2, and over the signal channels S*v*2 and S*r*2. In similar fashion, the speaking path F3, as well as signal channels S*v*3 and S*r*3, extend between exchange offices B and C. The letters *v* and *r* indicate that the signals are respectively transmitted in forward and reverse directions, between the registers.

It is preferred that at least one of the signal channels be a speaking path, so that, in the event of failure of a common signal channel, another speaking path can be connected as a substitute signal channel.

In the originating exchange office A are provided two registers UR*v* and UR*r*. The former register UR*v* is connected by way of couplings RW4 and SW1, and signal channel S*v*2, to transit register TR*v*1. On the other hand, register UR*r* is connected to transit register TR*r*1 over couplings RW6 and SW3, as well as signal channel S*r*3. Corresponding couplings and signal channels are employed to connect the transit registers TR*v*2 and TR*r*2 to the transit registers TR*v*1 and TR*r*1, or the terminal registers ER*v* and ER*r* of the terminal office C, to the transit registers TR*v*1 and TR*r*1.

In each of the three offices a transmitter/receiver for signals and other information is provided for joint use by all registers. For example, data apparatus DG1, DG2 and DG3 are indicated as provided for this purpose. Furthermore, each exchange office respectively contains a central control apparatus ZS1, ZS2 and ZS3 in which, among other information, may be stored the use condition of the lines.

As indicated by the drawing, the individual apparatus elements are connected to each other over couplings. The arrow within each coupling symbol shows the direction in which the coupling is effective. During the initial set-up of a connection, the following processes take place: when a call is received at the exchange office A over line F1, then in the usual manner the inlet repeater. U*e*A is first seized, and then a pulse emitter ZIG is seized. Thereupon an originating register UR*v* connect itelf in forward direction to the pulse emitter ZIG for the reception of dial information. The central control apparatus ZS1 determines which directions are to be considered for the set-up of the connection, by reason of the participating dial identification number which determines the direction. Moreover, the central control apparatus determines in which bundles or groups of trunks there is an open line available.

In accordance with the result of these determinations, the register UR*v* seizes, over directional coupling RW4, a signal channel S*v*2 which leads to the desired transit office B. A seizure signal is then transmitted over the signal channel and causes register TR*v*1 in transit exchange office B to connected itself to the signal channel via a dial signal seeker SW1. After this process, or simultaneously, the data apparatus DG1 is connected to the register UR*v* over coupling K7, while the data apparatus DG2 in the exchange office B is connected to the transit register TR*v*1 over coupling K9.

The originating register UR*v* reports to the transit register TR*v*1 the number of the long distance line F2 which was seized by the direction dialer RW1 (that is, the origination identification and the long line number). The transit register TR*v*1 is then connected by a coupler K3 to the onward switching set A*n*S1 associated with speaking path F2. Since the signal channel S*v*2 is no longer needed at this time, it is released. In appropriate cases, the signal channel may be released only after a test is carried out to determine whether the desired connection was set up correctly.

Next, the direction determining identification number is transmitted from the originating register UR*v* into the intermediate register TR*v*1, over the speaking path F2. Suitably, the same transmission method as on the signal channels is used in this case.

A speaking path F3, as well as a signal channel S*v*3, determined by the identification received, are connected to the transit register TR*v*2 of the exchange office C, in similar fashion as the above-described procedure. After the transit register TR*v*2 is switched onto the line F3, the identification number may be transmitted from the transit register TR*v*1 to the transit register TR*v*2. In an appropriate case, this identification number could alternatively be repeated directly from the originating register UR*v* to the transit register TR*v*2.

The transit register TR*v*1, being no longer required, disconnects itself from the system.

In the exchange office C the transit register TR*v*2 responds to the identification number supplied it and determines whether the connection required is to be switched through to a further exchange office, or whether the office C is the terminal office for this particular traffic. If office C is established to be the terminal office for the incoming connection, coupling RW3 connects line F3 to a repeater U*e*E for the terminating traffic. The transit register TR*v*2 is then released. The terminal register ER*v* is then connected, by way of coupling K5, to the repeater U*e*E. Also, a data apparatus DG3 is connected to the terminal register over the coupling K14.

The terminal register ERv then sends to the originating register URv over the speaking path, a signal "ready for dialing-terminating traffic." This signal will at the same time indicate in what fashion the subscriber's numbers still required to be received are to be sent out; that is, whether individually or as a group. The terminal register ERv receives the digits picked up in whichever manner is desired, from the originating register, and sends them in any way demanded by the connection system. After the last digit is set up in the terminating dialer, the dialing termination signal is sent back to the originating exchange office A. In an appropriate case there may also be sent back the free signal, or the party busy signal. Since the registers are no longer needed, they are switched off from the lines. If the called subscriber is busy, or if the trunk is busy, the release of the connection path can now occur.

If the called party picks up the receiver, the initiation signal is given through from terminal exchange office C to originating exchange office A. This happens in such manner that the terminal register ERr is first occupied and then forwards the initiating signal over signal channels Sr3 and Sr2, as well as the transit register TRr1. Eventually the signal reaches the originating register URr which switches itself to the pulse emitter ZIG. This last switching operation occurs witn the aid of the central control means, over a coupling K1. The register then reports the initiation signal to the pulse emitter. In appropriate circumstances, the central control means can operate in such fashion that coupling K1 is omitted, and the initiation signal be provided directly to the pulse emitter ZIG. The central control means of course determines which signal channels are to be connected, in a manner already indicated.

Since the signal channels are only needed for a short time, because tney do not have to wait until the speaking paths are eventually set up, the number of signal channels in reverse direction, and the number of coupling fields pertaining thereto, can be kept at a minimum.

After a speaking path is set up, it is important for the production of a connection over signal channels for transmission of forward and reverse signals, to find out which incoming line is connected to which outgoing line in the exchange office in question. This pathfinding operation could be performed with the aid of a speaking path network, or a special pathfinder network. However, in accordance with the invention, this task is solved simply, since there is assigned a central control means (ZS1, ZS2 and ZS3) to each speaking path coupling. This central control means contains a storage device, such as a magnetic core memory in which the registers can place the information as to which incoming line is connected to which outgoing line. For example, the transit register TRv1 can furnish a signal to be stored in accordance with the operation of the direct dialing means RW2. In this system, neither the direct dialing means nor the speaking path is engaged or influenced in any way.

In the system described the speaking paths only serve for the transmission of speech and for the exchange of messages between registers. Combined line signals which would require line repeaters at the beginning and at the end of a long distance section, are not transmitted. Moreover, because of the production of connections through central control means ZS, and the storage of the information as to use condition of the speaking paths, in each exchange, the use conductors (c-conductors) are also superfluous.

Th required line signals are transmitted over special signal channels common to several speaking paths. These channels are provided with simple combined line signalling arrangements which provide for the occupation and release of the signal channel.

As indicated above, it is also possible to operate the signal channels in opposite directions. Referring to FIG. 2, for such purposes, the onward switching couplers, such as RW4 and SW3 in FIG. 1, are joined together into a double operation coupler RSW43. The same is true with respect to couplers K1 and K2 which are joined together into coupler K12, to connect the now common originating register UR to the central pulse emitter ZIG. The other changes are obvious from the drawing.

It will be apparent that many minor changes can be made in the apparatus described above, as well as in the specific procedures contemplated hereby. Accordingly, the invention is not to be considered limited to the descriptions in this application, but rather only by the scope of the appended claims.

We claim:

1. In a method of long distance dial telephone communication, wherein connections are produced and supervised by way both of speaking paths and signal channels common to several speaking paths, and wherein the control of switching members in the exchanges is by way of registers, the improvement comprising:
transmitting line signals over the signal channels,
and transmitting register signals over the speaking paths.

2. The method of claim 1 including the step of storing in each exchange, information as to the use or seizure condition of the individual speaking paths, as well as information identifying the connections between the speaking paths, so that such information can be recalled as often as desired.

3. The method of claim 2 in which incoming connections are first switched to a transit register at a terminal exchange and then switched to a terminal register thereof, only after it is ascertained by the received signal that such exchange is the terminal exchange for that connection.

4. The method of claim 1 wherein speaking paths and signal channels common to several speaking paths are associated with each exchange, further comprising:
registering the dial signals of a call connection demand received by a given exchange,
evaluating the registered dial signals to determine the direction of the demanded call connection,
selecting an available speaking path and an available signal channel common thereto for connecting the given exchange with a subsequent exchange in the direction of the demanded call connection,
transmitting line signals, including signals to identify the selected speaking path corresponding to the call connection demand being processed, over the selected signal channel to the subsequent exchange, and
transmitting register signals over the corresponding, selected speaking path to the subsequent exchange.

5. The method of claim 4 further comprising, releasing the selected signal channel upon identification of the corresponding, selected speaking path by the subsequent exchange.

6. The method of claim 4 further comprising, transmitting only the dial signals identifying the direction of the demanded call connection over the selected speaking path to a subsequent transit exchange.

7. The method of claim 4 wherein plural exchanges are required for processing and supervising the call connection demand, further comprising:
transmitting line signals from the originating and each subsequent exchange, in sequence, to the respectively next succeeding, subsequent exchange over the respectively associated selected signal channels to identify the corresponding one of the respectively associated selected speaking paths, and
transmitting register signals from the originating exchange, in sequence, to each successive one of the plurality of subsequent exchanges over the respectively associated plurality of selected speaking paths connecting the originating exchange with said successive subsequent exchanges.

8. The method of claim 3 for completing a connection between an originating and a terminal exchange further including:

transmitting a signal from the terminal exchange to the originating exchange over the speaking paths connected therebetween to request receipt of the dial signals required for completion of the demanded call connection, and transmitting the requested dial signals from the originating exchange to the terminal exchange for completing the call connection.

No references cited.

WILLIAM C. COOPER, *Primary Examiner.*

U.S. Cl. X.R.

179—41